N. A. OLSON.
LINE CLAMP.
APPLICATION FILED MAY 6, 1914.
1,190,449.
Patented July 11, 1916.
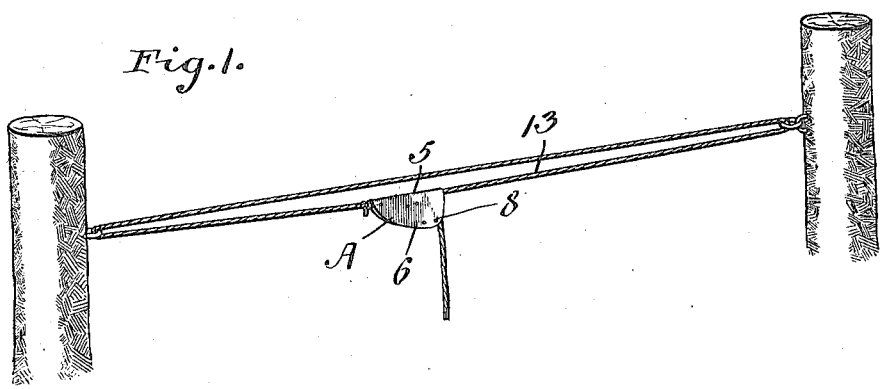
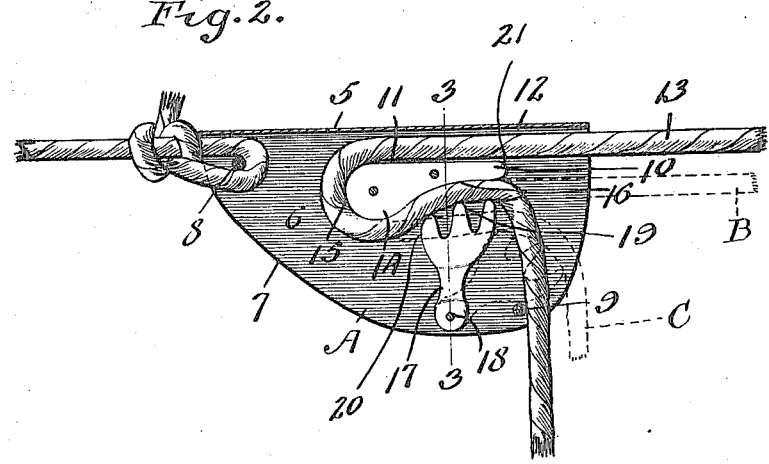
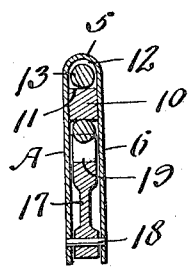
Witnesses
O. Andreser Jr.
H. S. Maddox.
Inventor
N. A. Olson,
By
Attorney

UNITED STATES PATENT OFFICE.

NELS A. OLSON, OF WATERBURY, CONNECTICUT.

LINE-CLAMP.

1,190,449.  Specification of Letters Patent.  Patented July 11, 1916.

Application filed May 6, 1914. Serial No. 836,655.

*To all whom it may concern:*

Be it known that I, NELS A. OLSON, a citizen of the United States, residing at Waterbury, in the county of New Haven and State of Connecticut, have invented new and useful Improvements in Line-Clamps, of which the following is a specification.

The invention relates to clothes line holders, and more especially to the class of line clamps. The clamp is designed more particularly for use with clothes lines, although the same may be used with flexible cables, guy or other ropes, or the like.

The primary object of the invention is the provision of a clamp wherein the line can be readily and easily drawn therethrough for the stretching or making taut thereof and for the automatic fastening of the same without possibility of any slack therein or the working loose of the said line.

Another object of the invention is the provision of a clamp wherein the same is rendered light in weight without detriment to its strength and durability, and is of novel form to insure the perfect working thereof.

A further object of the invention is the provision of a clamp wherein the line will be guided therein to avoid the kinking or mutilation of the same when in the act of stretching the line, the guide for the latter being also adapted as a cam or stationary jaw to coöperate with a gravity catch or dog forming the movable jaw to clamp or firmly grip the line for holding it in adjusted position.

A still further object of the invention is the provision of a clamp which is simple in construction, reliable and efficient in its use, strong, durable, and inexpensive in manufacture.

Other objects will be in part obvious and in part hereinafter pointed out.

The invention accordingly consists in the construction, combination of elements and arrangement of parts which will be exemplified in the construction hereinafter set forth, and the scope of the application of which will be indicated in the appended claim.

In the drawing:—Figure 1 is a perspective view of a line and support therefor, showing the clamp constructed in accordance with the invention applied. Fig. 2 is an enlarged vertical longitudinal sectional view of the same, showing the line therein and illustrating two positions of the gravity jaw. Fig. 3 is a sectional view on the line 3—3 of Fig. 2.

Similar reference characters indicate corresponding parts throughout the several views in the drawing.

Referring to the drawing in detail, the clamp comprises an inverted substantially U-shaped elongated housing A, preferably made from sheet metal forming a semi-tubular crown 5, and spaced parallel side cheeks 6 provided with curved free edges 7, the cheeks being held rigid through the medium of a plurality of cross bolts, pins, or rivets 8, which unite the same together and carry spacer sleeves 9 which are arranged between the cheeks 6 and avoid any approach of the cheeks toward each other or the collapsing of the housing in any event.

Within the housing A between the cheeks 6 and spaced from the crown 5 is a guide block 10, which has a flat surface 11 contiguous to and parallel with the crown to form therebetween a passageway 12 for the line 13, which has one end suitably connected to the said housing A, while its opposite end is free for adjustment therein in a manner presently described.

The guide block 10 is formed with an enlarged inner end portion 14 having a rounded edge 15 over which is trained the line 13 after passing through the passageway 12 to ride over a cam surface 16 gradually curved with respect to the rounded edge 15 and formed in the said block so that the line 13 can be firmly clamped on the cam surface 16 in a manner presently described.

Pivotally supported in the housing A between the cheeks is a sector-shaped gripping pawl or dog 17, the pivot 18 carrying the same being mounted in the checks of the housing and is located at one side of the enlarged inner end portion 14 of the stationary block 10 so that the dog will swing toward and away from the cam surface 16 on the block, the dog 17 being formed with a plurality of relatively long teeth providing a serrated jaw edge 19 which is adapted to bite into the line 13 when forced against the cam surface to compress the said line between the same and the said jaw edge 19 so that the latter will firmly grip and hold the line after the stretching thereof without possibility of the slackening of the same, or when the line 13 is pulled upon and a portion of its free end is held substantially parallel with the stretch of the line the dog 17 will gravitate in a reverse direction away from the cam surface 16 to permit free play of the said line 13 for allowing the tightening thereof.

When the dog 17 is in the position shown by dotted lines in Fig. 2 of the drawing and it is desired to loosen or stretch the line 13 a portion of the free end of the same is moved substantially parallel with the stretch of said line, as at B, so that the same will escape the jaw edge 19 of the dog and freely pass over the rounded portion 20 of the latter, thus allowing the loosening of the line or the tightening thereof as the occasion may require. Now, to effect the locking of the line 13, the free end of the same is shifted to the position as at C to bring it against the jaw edge 19 of the dog, and on slight release of tension upon said end of the line 13 the latter picks up the dog 17, which is automatically moved toward the cam surface 16 of the block for the firm gripping of the line between it and the dog.

The outer end of the guide block 10 is formed with a rounded surface 21 which avoids the cutting or mutilation of the line when being pulled through the guideway 12 between the said block 10 and the crown 5 of the housing. It will be noted that the line will not kink and will freely slide through the guideway 12 around the portion 14 of the block 10 when being pulled upon so as to be automatically clamped on the releasing of the line. The jaw edge 19 of the dog 17 is slightly curved to act with the cam surface 16 so as to assure the perfect coöperation therebetween. It is of course to be understood that the housing A and block 10 may be cast integral with each other. However, these parts, together with the other parts of the device, can be made in any desirable manner which would cheapen the cost of manufacture thereof.

From the foregoing it is thought that the construction and manner of operation of the device will be clearly understood, and therefore a more extended explanation has been omitted.

What is claimed is:—

A rope clamp comprising a substantially U-shaped housing in cross section, a guide block permanently fixed within the casing and having a flat upper edge spaced from one wall of the casing defining a passage for the free end of the rope, said block having an enlarged rounded end portion and its lower edge curved reversely to said end portion, the rope being adapted to be trained over said flat upper edge and enlarged end portion of the block, and engage the curved lower edge thereof, a cam pivoted between the walls of the housing below said block at a right angle thereto when in operative position, said cam being free to fall away from said block to an inoperative position, and means for limiting the falling movement of said cam, said cam having a serrated jaw edge correspondingly curved with respect to said curved surface of the block for effectively clamping the rope therebetween.

In testimony whereof, I affix my signature in presence of two witnesses.

NELS A. OLSON.

Witnesses:
 FRANK B. NOBLE,
 IRENE KNOTT.

Copies of this patent may be obtained for five cents each, by addressing the "Commissioner of Patents, Washington, D. C."